(12) United States Patent
Karim et al.

(10) Patent No.: US 8,538,410 B2
(45) Date of Patent: Sep. 17, 2013

(54) USER-CUSTOMIZED MOBILITY METHOD AND SYSTEM IN A MOBILE COMMUNICATION SYSTEM

(75) Inventors: Fatima Karim, Paris (FR); Sana Ben Jemaa, Issy les Moulineaux (FR)

(73) Assignee: France Telecom, Paris (FR)

( * ) Notice: Subject to any disclaimer, the term of this patent is extended or adjusted under 35 U.S.C. 154(b) by 626 days.

(21) Appl. No.: 12/446,091

(22) PCT Filed: Oct. 16, 2007

(86) PCT No.: PCT/FR2007/052168
§ 371 (c)(1),
(2), (4) Date: Apr. 17, 2009

(87) PCT Pub. No.: WO2008/047040
PCT Pub. Date: Apr. 24, 2008

(65) Prior Publication Data
US 2010/0216426 A1    Aug. 26, 2010

(30) Foreign Application Priority Data

Oct. 17, 2006 (FR) ...................................... 06 54327

(51) Int. Cl.
*H04W 4/00* (2009.01)
(52) U.S. Cl.
USPC ..... 455/422.1; 455/26.1; 455/434; 455/456.1
(58) Field of Classification Search
USPC ........................................ 455/26.1, 434, 456
See application file for complete search history.

(56) References Cited

U.S. PATENT DOCUMENTS

| 5,440,758 | A | * | 8/1995 | Grube et al. ....................... 455/9 |
| 5,924,038 | A |   | 7/1999 | Uistola |
| 6,011,973 | A | * | 1/2000 | Valentine et al. ........... 455/456.6 |
| 7,046,990 | B2 | * | 5/2006 | Grego et al. ................... 455/410 |
| 2004/0157600 | A1 | * | 8/2004 | Stumpert et al. ........... 455/432.1 |
| 2004/0192211 | A1 | * | 9/2004 | Gallagher et al. .......... 455/67.11 |
| 2009/0047968 | A1 | * | 2/2009 | Gunnarsson et al. ......... 455/446 |

FOREIGN PATENT DOCUMENTS

| WO | WO 99/14974 | 3/1999 |
| WO | WO 00/18168 | 3/2000 |
| WO | WO 02/28124 | 4/2002 |
| WO | WO 03/085992 | 10/2003 |
| WO | WO 2005/120017 | 12/2005 |

* cited by examiner

*Primary Examiner* — Lester Kincaid
*Assistant Examiner* — Isaak R Jama
(74) *Attorney, Agent, or Firm* — Knobbe Martens Olson & Bear LLP

(57) ABSTRACT

An access point to a restricted-access cell of a cellular network detects at least one cell of the cellular network in the vicinity of the cell in which it is located. It sends a server of the cellular network an identifier (RAC1) of the restricted-access cell, an identifier of the cell(s) detected, and an identifier of at least one user (U1) authorized to access the restricted-access cell. On reception of this information, the server stores it in a database (26) and can therefore send a mobile terminal (10) of said user (U1) the identifier (RAC1) of the restricted-access cell it is authorized to access. This identifier can be sent if the server detects that the mobile terminal (10) is in the vicinity of the restricted-access cell and/or periodically and/or in the event of a change to the information stored in the database (26) of the server.

19 Claims, 2 Drawing Sheets

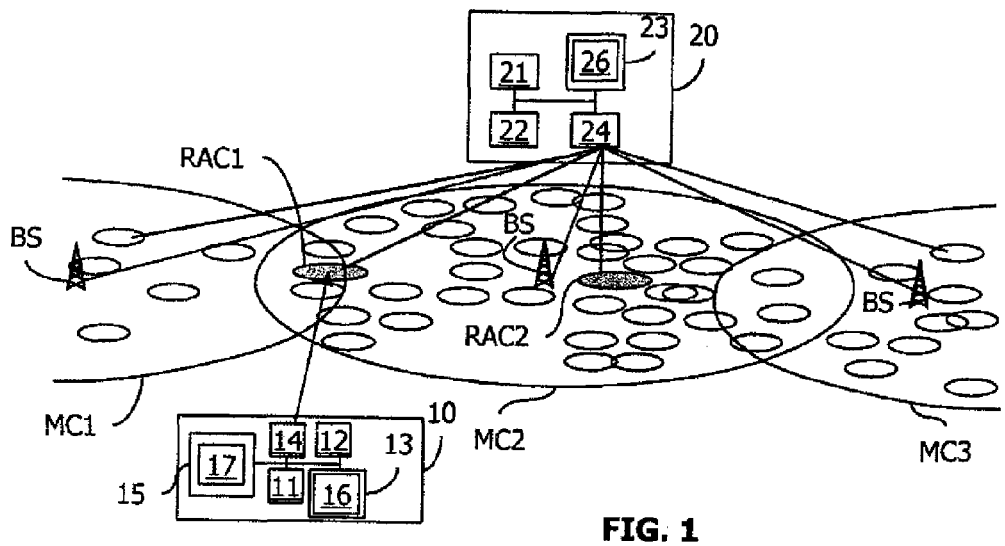
FIG. 1
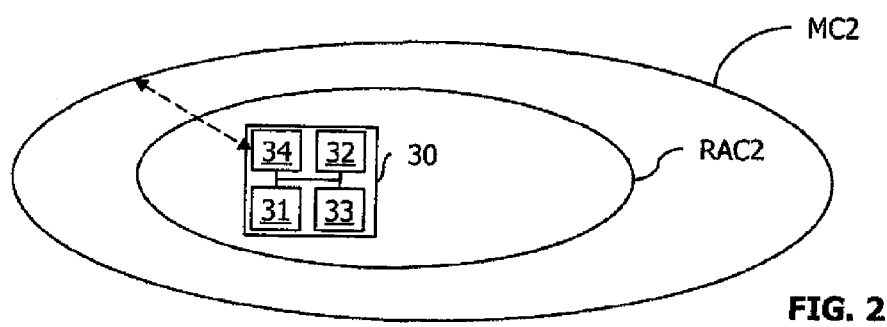
FIG. 2
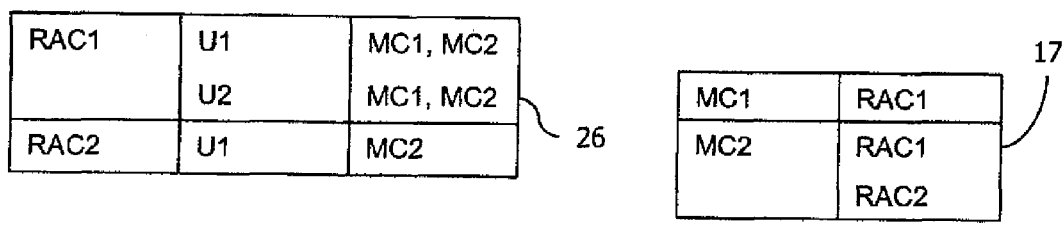
FIG. 3          FIG. 4

USER-CUSTOMIZED MOBILITY METHOD AND SYSTEM IN A MOBILE COMMUNICATION SYSTEM

RELATED APPLICATIONS

This is a U.S. National Phase Application under 35 USC §371 of International Application PCT/FR2007/052168, filed on Oct. 16, 2007.

This application claims the priority of French application no. 06/54327 filed on Oct. 17, 2006, and the content of which is hereby incorporated by reference.

BACKGROUND OF THE INVENTION

The field of the invention is that of mobile telecommunications networks that offer procedures for mobility between cells.

The invention applies in particular to UMTS Terrestrial Radio Access Networks (UTRAN) and GSM Edge Radio Access Networks (GERAN).

In such networks it is known that mobile telecommunications terminals in a mobility situation attempt to connect to cells whose identifiers are contained in a list that they manage and that contains the identities of the cells on which measurements are to be effected by the mobile terminal.

Using a known mechanism, the mobile terminals effect these measurements (in particular field measurements) on each of the cells identified in the list, and they select the cell that gives the maximum level for these measurements.

According to the Third Generation Partnership Project (3GPP) standard, this list is stored in the mobile terminal in a CELL-INFO-LIST variable.

The list of cells to be measured by the mobile is constructed from information about the adjacent cells received by the mobile terminal, either from its attachment cell (i.e. the cell on which it is camped when a reselection mechanism is being applied) or, in the situation of a transfer between cells (connected mode mobility or handover mechanism), from an entity of the network known as a radio network controller (RNC) that controls the base stations.

When the mobile terminal is in idle mode, the list of adjacent cells received by a mobile terminal is broadcast by the network in a System Information Block 11 (SIB 11) message.

When the mobile is in connected mode (i.e. communicating), the list of adjacent cells is sent to it in a Measurement Control message.

The invention is particularly directed to networks offering procedures for mobility to restricted-access cells, i.e. cells to which access is reserved to a closed user group.

Restricted-access cells are typically used in a residential or professional context.

The above-described mechanisms by which the network informs a mobile terminal about its adjacent cells cannot be used to offer the terminal a list of its adjacent restricted-access cells.

The list of adjacent cells contained in the SIB 11 and SIB 12 messages depends neither on the mobile terminal to which it is broadcast or sent nor on the user of that terminal. In other words, these messages are identical for all terminals attached to the same serving cell or the same RNC.

Consequently, in the current state of the art, if these messages were used to communicate restricted-access cell identifiers, those identifiers would also be received by terminals not entitled to access those cells, which would have two disadvantages.

Firstly, in order to attempt to connect to them, the mobile terminals would effect measurements on those cells that would be of no utility, since access to them would in the end be refused.

Secondly, only a limited number of identifiers can be contained in the list managed by a terminal (32 in intra-frequency in the case of the CELL-INFO-LIST variable). Now, it is reasonable to think that this number would be relatively small in geographical areas in which a large number of restricted-access cells might be installed, and that it is highly desirable not to clutter the list with identifiers of cells to which access by the terminal is entirely impossible because it is prohibited.

SUMMARY OF THE INVENTION

A first aspect of the invention relates to a server adapted to be used in a cellular network, which server includes:
  means for receiving an identifier of a user, an identifier of a restricted-access cell authorized for that user, and at least one identifier of a detection area of said restricted-access cell, coming from an access point to said restricted-access cell;
  means for storing said received identifiers; and
  means for sending said identifier of said restricted-access cell to a mobile terminal of said user.

The term "detection area" is used to mean a geographical area in the vicinity of the radio coverage area of the restricted-access cell.

The above-mentioned server may be an RNC entity, for example.

It may also be contained in an OMC (Operations and Maintenance Center) entity of the RNC.

Another aspect of the invention relates to a method of setting parameters of a mobile terminal, adapted to be used by a server in a cellular network. Such a method includes:
  a step of said server receiving an identifier of a user, an identifier of a restricted-access cell authorized for that user, and at least one identifier of a detection area of said restricted-access cell;
  a step of storing said received identifiers in a database; and
  a step of sending the identifier of said restricted-access cell to a mobile terminal of said user.

Generally speaking, the invention allows to customize the communications terminal's list of adjacent cells, grouping together potential cells to which the terminal may attempt to connect and taking into account preferred target cells for that terminal.

As a corollary, and highly advantageously, only mobile terminals having access to the cell attempt to connect to it.

This feature restricts access attempts to only those cells that are authorized for a given user.

The above advantages are obtained by means of the novel and inventive approach of the invention, which entails centralized management of the data relating to a public cellular network and to a network of restricted-access cells, where these two networks may be managed by different operators.

Such centralized management relies on the existence of a database in a server of the public cellular network in which there are stored in corresponding relationship: user identifiers; identifiers of restricted-access cells that they are authorized to access; and identifiers of associated detection areas.

In a particular implementation of the invention, the server detects that the mobile terminal is in a detection area of a restricted-access cell that the user of the terminal is authorized to access. The server then sends the mobile terminal the identifier of the restricted-access cell.

The mobile terminal then adds the restricted-access cell identifier(s) received from the server to its list of potential cells (CellInfoList). The RNC may send the restricted-access cell identifier to the mobile terminal in the form of a Measurement Control message.

According to one particular feature of the invention, the detection area corresponds to the coverage area of a cell of the network.

A cell may in particular be a macrocell or a microcell of a GSM (Global System for Mobile Communications) or UMTS (Universal Mobile Telecommunications system) public network. The coverage area of a microcell generally has a range of the order of one hundred meters. A microcell may be deployed to absorb local heavy communication traffic (for example on a particular portion of a major road or at a roundabout).

Accordingly, if the server detects that the terminal is in the coverage area of one of these macro- or microcells, it sends a message (for example a Measurement Control message) to the terminal, triggering addition, by the terminal, to the list of potential cells, of the identifier of the restricted-access cells that are in the vicinity of this cell, with the result that the terminal attempts to connect to these preferred cells during these transfers.

From the moment at which the identifier of the restricted-access cell is added to the list of potential cells, the mobile terminal can effect measurements (in particular field measurements) on these cells. An appropriate mobility algorithm parameter favors mobility of the mobile terminal to these restricted-access cells.

In another implementation of the invention, the server also sends the mobile terminal, in addition to the restricted-access cell identifier, an identifier of the detection area of this restricted-access cell, and it does so periodically (for example once a month) and/or in the event of a change to one or more of the identifiers stored in the storage means (for example if access to a new restricted-access cell is subsequently authorized for the user of the mobile terminal or in the event of a change to the identifier of a detection area associated with a restricted-access cell).

In this implementation, the mobile communications terminal includes:
  a database associating at least one identifier of a detection area with at least one identifier of a restricted-access cell that the user of the terminal is authorized to access;
  means for detecting that the terminal is in the detection area; and
  means for adding the identifier of the restricted-access cell to the list following such detection.

In a particular implementation, the database is stored in a portable object including a microcontroller, which object may be incorporated in and read by the mobile telecommunications terminal. This microcircuit card includes a database associating at least one detection area with at least one identifier of a restricted-access cell.

This object may be an SIM (Subscriber Identity Module) or USIM (UMTS Subscriber Identity Module) card.

Accordingly, when the terminal detects that it is in the detection area, it adds the identifier of the restricted-access cell that it may access to the list of potential cells to which it may attempt to connect.

In a scenario conforming to the invention, the identifier of the user, the identifier of the restricted-access cell, and the identifiers of the cells in the vicinity of the restricted-access cell are received from an access point to the restricted-access cell.

Thus another aspect of the invention relates to an access point to a restricted-access cell of a cellular network. This access point includes:
  means for detecting at least one cell of said cellular network in the vicinity of the cell comprising said access point;
  means for sending a server of said cellular network an identifier of said restricted-access cell, an identifier of the cell(s) detected, and an identifier of at least one user authorized to access said restricted-access cell.

Another aspect of the invention relates to a configuration method that can be used by an access point to a restricted-access cell in a cellular network. This configuration method includes:
  a step of obtaining the identifiers of cells in the vicinity of the access point; and
  a step of sending those identifiers to a server.

Thus in a scenario conforming to the invention, when a user installs an access point, for example a home gateway, that access point automatically detects the public cells in its vicinity and sends their identifiers to the server of the invention.

In a particular implementation of the invention, the server sends the identifier of the cell and the identifier of the restricted-access cell to the mobile terminal in an SMS (Short Message Service) format message.

On reception of this message, the mobile terminal of the invention stores this information in its database.

In a first variant of the invention, the server of the invention does not store this information.

In a second variant, it stores this information in a database.

In a particular implementation, the various steps of the parameter setting method or the configuration method are determined by computer program instructions.

Consequently, an aspect of the invention is directed to a computer program on an information medium, adapted to be executed in a computer, and including instructions adapted to execute the steps of a parameter setting method or a configuration method as described above.

This program may use any programming language and take the form of source code, object code or a code intermediate between source code and object code, such as a partially-compiled form, or any other desirable form.

Another aspect of the invention is directed to a computer-readable information medium containing instructions of the above computer program.

The information medium may be any entity or device capable of storing the program. For example, this medium may include storage means, such as a ROM, for example a CD ROM, or a micro-electronic circuit ROM, or magnetic storage means, for example a floppy disk or a hard disk.

Moreover, the information medium may be a transmissible medium such as an electrical or optical signal, capable of being routed via an electrical or optical cable, by radio, or by other means. The program of the invention may in particular be downloaded over an Internet-type network.

Alternatively, the information medium may be an integrated circuit in which the program is incorporated that is adapted to execute the method in question or to be used in its execution.

BRIEF DESCRIPTION OF THE DRAWINGS

Other features and advantages of the present invention emerge from the description given below with reference to the appended drawings, which show one non-limiting embodiment of the invention. In the figures:

FIG. 1 represents a mobile terminal and a server of the invention in their environment;

FIG. 2 represents an access point of the invention in its environment;

FIGS. 3 and 4 respectively represent databases of the server and the mobile terminal represented in FIG. 1;

DETAILED DESCRIPTION OF ONE EMBODIMENT

FIG. 1 represents a mobile terminal 10 and a server 20 of one particular embodiment of the invention.

The mobile terminal 10 is that of a user U1.

In this figure three cells MC1, MC2, and MC3 are represented, each of these cells being defined by the coverage area of a base station BS.

In this figure there are represented:
a first restricted-access cell RAC1 in the coverage area of the cells MC1 and MC2; and
a second restricted-access cell RAC2 in the coverage area of only the cell MC2.

In the embodiment described here, the three base stations are managed by a server 20 that, in accordance with the invention, may be of the RNC type.

In the embodiment described here, the server 20 has the hardware architecture of a conventional computer.

It includes in particular a processor 21, communication means 24, a read-only memory (ROM) 22, and a random-access memory (RAM) 23.

The communication means 24 enable it to communicate with the three base stations BS and with the access points managing the restricted-access cells RAC1 and RAC2.

Figure 6:
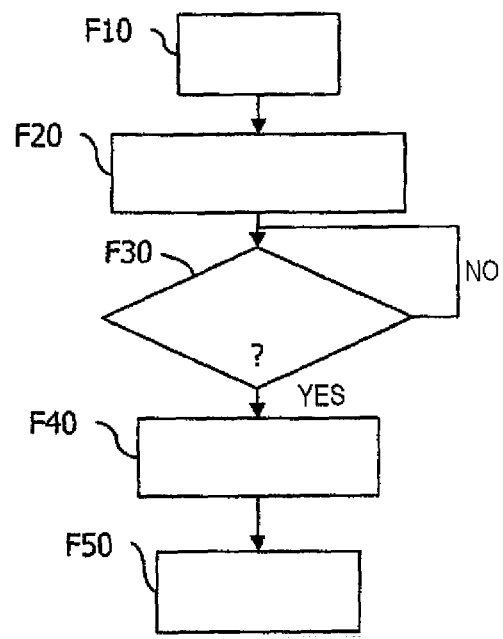
FIG. 6 represents in flowchart form the main steps of a parameter setting method of one particular embodiment of the invention.

The read-only memory 22 of the server 20 is a storage medium storing a computer program including instructions for executing the parameter setting method whose main steps are represented in FIG. 6.

The mobile terminal 10 of the invention includes a processor 11, a read-only memory (ROM) 12, a random-access memory (RAM) 13, communication means 14, and a SIM (or USIM) card 15.

The communication means 14 enable the mobile terminal 10 to communicate with the base stations BS and with the access points 30 (not represented in FIG. 1) to the restricted-access cells RAC1 and RAC2.

Figure 7:
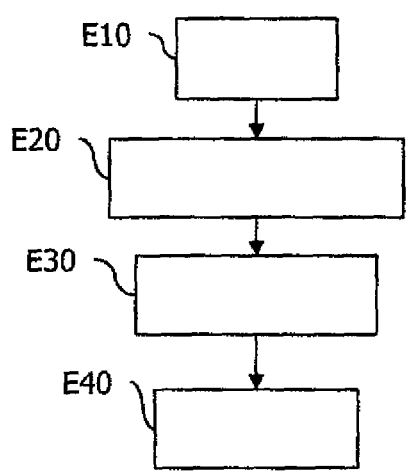
FIG. 7 represents in flowchart form the main steps of a connection method of one particular embodiment of the invention.

The read-only memory 13 of the mobile terminal 10 is a storage medium storing a computer program including instructions for executing the steps of the connection method of the invention whose main steps are represented in FIG. 7.

In FIG. 2 there is represented the access point 30 of the invention managing the restricted-access cell RAC2.

This access point has the architecture of a conventional computer.

It includes a processor 31, a read-only memory (ROM) 32, a random-access memory (RAM) 33, and communication means 34.

According to the invention, the detection means 34 of the access point 30 are adapted to detect that it is in the vicinity of the cell MC2 and to identify the adjacent cells of the restricted-access cell RAC2.

In the same way, the access point of the restricted-access cell RAC1, not represented here, is adapted to detect that it is in the vicinity of the cells MC1 and MC2.

Figure 5:
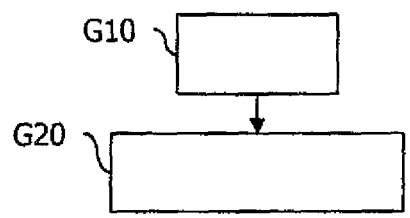
FIG. 5 represents in flowchart form the main steps of a configuration method of one particular embodiment of the invention.

The read-only memory 32 of the access point 30 is a storage medium storing a computer program of the invention comprising instructions for executing the steps of the configuration method of the invention whose main steps are represented in FIG. 5.

Each of these access points is adapted to send the RAC server 20 a list of identifiers of the adjacent cells MC1, MC2 detected in its vicinity and the identifiers of the users authorized to access the access point. These identifiers may be scrambling codes, for example.

In the embodiment described here, the random-access memory 23 of the server 20 of the invention includes a database 26 represented in FIG. 3.

This database contains two records, one for the first restricted-access cell RAC1 and one for the restricted-access cell RAC2.

Consequently, the record for the first restricted-access cell RAC1 contains two lines, one for the user U1 of the mobile terminal 10 and one for a user U2.

The first line for the user U1 includes the identifiers MC1 and MC2 of the cells MC1, MC2, which means that:
the user U1 is authorized to access the restricted-access cell with the identifier RAC1; and
this restricted-access cell RAC1 is in the vicinity of the cells MC1 and MC2.

The same applies to the user U2.

Finally, the user U1 is also authorized to access the restricted-access cell with the identifier RAC2, which is in the vicinity of the cell MC2.

The information stored in this database may have been received from the access points 30 of the restricted-access cells RAC1 and RAC2 (see above).

In this scenario, when installing an access point 30, the user sets the parameters of the identifiers of the users authorized to access the restricted-access cell as defined by this access point.

The operator of the network may also store this information in the database 26 directly.

In the embodiment described here with reference to FIG. 7, on receiving information concerning the user U1, the server 20 sends an SMS message to the mobile terminal 10 of that user U1, the information contained in that SMS message having been stored in the database 17 (see FIG. 4) of the SIM card 15 of the mobile terminal 10.

This database includes two records for the cells MC1 and MC2.

The first record associates the identifier of the cell MC1 with the identifier of the restricted-access cell RAC1.

This means that if the terminal is in the cell MC1, it must add the identifier of the restricted-access cell RAC1 to the list 16 of the cells to be measured and to which the terminal may attempt to connect. The list 16 may be the Cell-Info-List defined by the 3GPP.

The second record from the database 17 associates with the cell MC2 the identifiers of the restricted-access cells RAC1 and RAC2.

This means that if the mobile terminal 10 is in the coverage area of the cell MC2 it must add the identifiers of the restricted-access cells RAC1 and RAC2 to the list 16 of cells to which it may attempt to connect.

The SMS message sent by the RNC 20 (or any other type of message containing the identifier of a restricted-access cell authorized for the user of the mobile terminal and the identifier of an associated detection area) may be sent to the terminal periodically, for example once a month. It may equally be sent to the terminal by the RNC 20 each time that a change concerning it is made in the database 26.

The main steps of the configuration method used by the access point 30 are represented in FIG. 5.

During a step G10 of this method, the access point 30 obtains the identifier of the macrocell or microcell MC1 in its vicinity.

This step G10 is followed by a step G20 in which the access point 30 sends the server 20 the identifier of the user U1 authorized to access the access point 30 and the identifier of the cell MC1.

The main steps of the parameter setting method of the invention used by the server 20 of the invention are described below with reference to FIG. 6.

During a first step F10, the server 20 receives from the access points 30 to the restricted-access cells RAC1 and RAC2 the identifiers of the users U1, U2 who are authorized to access these restricted-access cells, the identifiers RAC1 and RAC2 of the cells, and the identifiers MC1 and MC2 of the cells in the vicinity of these restricted-access cells. This information is stored in the database 26 already described.

This step F10 is followed by a step F20 in which the server 20 sends an SMS message to the mobile terminals containing, for each of the cells MC1 and MC2, the identifiers of the restricted-access cells in the vicinity of those cells that the mobile terminal 10 is authorized to access.

In the embodiment described here, this information is stored in the SIM card of the mobile terminal 10.

In a different embodiment, the information received from the various access points is not stored in the random-access memory 23 of the RNC server 20.

In the embodiment described here, this information is stored.

It should be noted that this step F20 is optional; the server 20 need not send the mobile terminals messages to inform them about the restricted-access cells that they may access in the vicinity of the cells MC1 and MC2. In this situation, the server goes directly from step F10 to step F30.

In this step F30, the server 20 determines whether the mobile terminal 10 of the invention is in connected mode (i.e. connected to the network).

If so, in a step F40, it determines whether the mobile terminal 10 is in one of the cells MC1 or MC2 and, if so, in a step F50, it sends the mobile terminal 10 a Measurement Control message containing the identifiers of the restricted-access cells in the vicinity of this cell that the terminal may access.

Here, the server 20 detects during the step F40 that the mobile terminal 10 is connected to the cell MC1, with the result that the Measurement Control message contains the identifier of the restricted-access cell RAC1.

It should be noted that, if the access point 30 sends the server 20 the identifiers of a plurality of cells situated in its vicinity, for example a macrocell and a microcell, the server 20 may, in the step F10, prioritize storing the identifier of the microcell in the database 26 in order to define the detection area associated with the restricted-access cell as the coverage area of that microcell.

The Measurement Control message sent during the step F50 has a limit size prescribed by the standards. It is therefore advantageous to ensure that the server 20 does not send too many restricted-access cell identifiers in the Measurement Control message. One solution to this problem is to dimension the detection area of a restricted-access cell adequately, for example by choosing as the detection area the cell with the smallest geographical coverage area.

The main steps of the connection method of the invention used by the mobile terminal 10 are described below with reference to FIG. 7.

In a step E10, the mobile terminal 10 receives the SMS message sent by the server 20 of the invention including, for each cell MC1, MC2, a list of the identifiers of the restricted-access cells RAC1, RAC2 in the vicinity of these cells that the user is authorized to access.

This information is stored in the database 17 of the SIM card 15 of the terminal 10 in a step E20.

If the terminal 10 detects (in a step E30) that it is in one of these cells, it adds the identifiers of these restricted-access cells to the list 16 of cells to which it may attempt to connect.

Here, on reception of the SMS message, the mobile terminal 10 stores in the database 17 the identifier of the cell MC1, the identifier of the restricted-access cell RAC1, and the identifier of the cell MC2 with the identifiers of the two restricted-access cells RAC1 and RAC2. When it detects that it is in the cell MC1, the mobile terminal 10 adds the identifier of the restricted-access cell RAC1 to the list 16 of cells to which it may attempt to connect. If it detects that it is in the cell MC2, the mobile terminal 10 adds the identifier of the two restricted-access cells RAC1 and RAC2 to the list 16 of cells to which it may attempt to connect. Thereafter, a transfer (handover) procedure may be effected to transfer the mobile terminal to the cell RAC1 or RAC2.

The invention finds one particular application in the context of a service offering private or business customers of a mobile communications operator wireless coverage in the home (second generation (2G), third generation (3G) or beyond 3G (B3G)) or on the premises of the business, for example in the form of a private wireless access station (residential or restricted to the business), connected to an ADSL (Asynchronous Digital Subscriber Line) modem or to any other high-bit-rate network access equipment (for example of the FTTH (Fiber To The Home) type). The access point 30 described above corresponds to a combination of this private wireless access station and the access equipment to the high-bit-rate network.

Anyone can therefore have their own home wireless access station with an associated list of subscribers authorized to access it (family members, friends, etc.). An access control mechanism may bar access to this private station to users not included in this list.

Similarly, in a professional context, a business could have one or more wireless access stations on its site, with access thereto limited to employees of the business and prohibited to visitors, for example.

The invention claimed is:

1. A system comprising an access point to a restricted access mobile telecommunications cell reserved to a closed group of users and authorized for a mobile telecommunications user and a server to manage base stations, coverage areas of which define cells for mobile telecommunications, the server being configured to:
   receive an identifier of the user, an identifier of the restricted-access cell, and at least one identifier of a detection area of said restricted-access cell, coming from the access point, said detection area including a mobile telecommunications cell, a base station of which is managed by said server, said cell being in a vicinity of a radio coverage area of the restricted-access cell;
   store the received identifiers; and
   send said identifier of said restricted-access cell to a mobile terminal of said user to enable said mobile terminal to attempt to connect only to restricted access cells to which said user is authorized to access and said access point being configured to determine that said user is authorized to access said restricted-access cell and determine said detection area of said restricted-access cell.

2. The system according to claim 1, wherein said restricted-access cell identifier is sent to said mobile terminal if said mobile terminal is detected in said detection area.

3. The system according to claim 1, wherein said identifier of said detection area includes an identifier of a cell of said network.

4. The system according to claim 1, further configured to send to said mobile terminal said identifier of said detection area of said restricted-access cell, wherein said identifier of said detection area of said restricted-access cell and said identifier of said restricted-access cell are sent periodically and/or if at least one of the stored identifiers concerning said mobile terminal is changed.

5. A method of setting parameters of a mobile terminal, comprising:
    determining, by an access point to a restricted-access mobile telecommunications cell reserved to a closed group of users, that a user is authorized to access said restricted-access cell and determining a detection area of said restricted-access cell, said detection area including a mobile telecommunications cell a base station of which is managed by a server to manage base stations, coverage areas of which define cells for mobile telecommunications;
    receiving, by said server from said access point, an identifier of a user, an identifier of said restricted-access cell authorized for the user, and at least one identifier of said detection area of said restricted-access cell, said detection area being a geographical area in a vicinity of a radio coverage area of the restricted-access cell;
    storing, by said server, the received identifiers in a database; and
    sending, by said server, the identifier of said restricted-access cell to a mobile terminal of said user to enable said mobile terminal to attempt to connect only to restricted access cells which said user is authorized to access.

6. A non-transitory computer readable medium, comprising a program including instructions for executing the steps of the parameter setting method of claim 5 when said program is executed by a computer.

7. An access point to a restricted-access mobile telecommunications cell, said restricted access cell being reserved to a closed group of users, configured to:
    detect and identify at least one mobile telecommunications cell in a vicinity of the restricted-access cell; a base station of said at least one cell detected and identified being managed by a server to manage base stations, coverage areas of which define cells for mobile telecommunications, determine that at least one user is authorized to access said restricted-access cell; and send said server an identifier of said restricted-access cell, an identifier of the at least one cell detected, and an identifier of said at least one user to enable a mobile terminal of said user to attempt to connect only to restricted access cells which said user is authorized to access.

8. The method according to claim 5, wherein the sending the identifier of said restricted-access cell to the mobile terminal of said user is performed when said terminal is in said detection area.

9. The method according to claim 5, wherein the sending the identifier of said restricted-access cell to the mobile terminal of said user is performed periodically or each time at least one of the stored identifiers concerning said mobile terminal is changed in said database.

10. The method according to claim 5, wherein the sending the identifier of said restricted-access cell to the mobile terminal of said user includes sending an SMS containing the identifier of said restricted-access cell.

11. The method according to claim 5, wherein the sending the identifier of said restricted-access cell to the mobile terminal of said user includes sending a Measurement Control message containing the identifier of said restricted-access cell.

12. The method according to claim 5, wherein the detection area comprises a microcell or a macrocell of a GSM or UMTS public network.

13. The method according to claim 5, further comprising adapting a mobility algorithm of the mobile terminal based on said identifier of said restricted-access cell.

14. The method according to claim 5, wherein the server receives the identifiers from a combination of a private wireless access station and an access equipment to a high bit rate network.

15. The method according to claim 5, wherein the access point manages said restricted-access cell.

16. The access point according to claim 7, wherein the restricted-access cell has an access reserved to a closed group of users in a residential or professional context.

17. The access point according to claim 7, comprising a private wireless access station.

18. The access point according to claim 7, wherein the at least one cell comprises a detection area of the restricted-access cell.

19. The access point according to claim 7, wherein the at least one cell comprises a macrocell or a macrocell of a GSM or UMTS public network.

* * * * *

UNITED STATES PATENT AND TRADEMARK OFFICE
CERTIFICATE OF CORRECTION

PATENT NO. : 8,538,410 B2  
APPLICATION NO. : 12/446091  
DATED : September 17, 2013  
INVENTOR(S) : Karim et al.

Page 1 of 1

It is certified that error appears in the above-identified patent and that said Letters Patent is hereby corrected as shown below:

In the Claims:

In column 9 at lines 41-42, In Claim 6, change "the steps of the" to --the--.

In column 10 at line 47, In Claim 19, change "macrocell" to --microcell--.

Signed and Sealed this  
Thirteenth Day of May, 2014

Michelle K. Lee  
*Deputy Director of the United States Patent and Trademark Office*